UNITED STATES PATENT OFFICE 2,590,978

INTRODUCTION OF A DOUBLE BOND ADJACENT A KETO GROUP IN KETOSTEROIDS

Edward C. Kendall and Vernon R. Mattox, Rochester, Minn., assignors to Research Corporation, New York, N. Y., a corporation of New York No Drawing. Application April 28, 1949, Serial No. 90,278. In Canada September 9, 1948

10 Claims. (Cl. 260—397.1)

This invention relates to a new method for the introduction of a double bond between carbon atoms vicinal to that of a keto group and consists essentially in the removal of hydrogen bromide from the carbon atoms vicinal to the keto group through the formation of a hydrazone. Restoration of the carbonyl group through removal of the hydrazine moiety yields the unsaturated ketone.

The invention is applicable to any carbocyclic compound and more particularly to any steroid compound which contains a keto group with an atom of halogen, e. g. bromine, alpha to the ketone and a hydrogen on the next adjacent carbon and which will lose hydrogen halide when heated with pyridine or other tertiary base such as collidine and which forms a hydrazone with the ketone group when treated with 2,4-dinitrophenylhydrazine or other derivative of hydrazine.

A method heretofore employed for the introduction of a double bond vicinal to a ketone group in a carbocyclic compound, e. g. in testosterone, progesterone and hormones of the adrenal cortex, is that disclosed by Butenandt and Schmidt (Ber. d. deutsch. chem. Gesellschaft 67, 2092, 1934) involving the removal of hydrogen bromide from the vicinal carbon atoms by treatment in boiling pyridine. That is to say, for the introduction of a double bond $C_4:C_5$ in a compound having a keto group at $C_3$ and hydrogen at $C_4$ and $C_5$ a hydrogen at $C_4$ is first replaced by bromine and hydrogen bromide is then removed leaving the 3-keto-$\Delta^{4,5}$ compound.

The method of the present invention, involving removal of the hydrogen bromide from the 4-bromo-3-keto compound through formation of a hydrazone, gives higher yields and is otherwise more desirable than said prior method which heretofore has been regarded as being the best method for the introduction of a double bond adjacent to a keto group. In the present method the materials used are inexpensive and very little labor is required. The invention is illustrated by the following examples:

Example 1

The 4-bromo derivative of methyl 3,11-diketo-12-bromocholanate, prepared by adding bromine to a solution of methyl 3,11-diketo-12-bromocholanate in acetic acid preferably in the presence of sodium acetate and crystallizing the resulting 4-bromo derivative from acetic acid, was dissolved in glacial acetic acid. To the solution twice the molecular equivalent of 2,4-dinitrophenylhydrazine was added. The solution rapidly became red and a heavy precipitate separated. Removal of the bromine as hydrogen bromide was complete. The red precipitate was removed by filtration and further crops were obtained by concentration of the acetic acid to a small volume. This product melted at 242–243° which is the melting point of the 2,4-dinitrophenylhydrazone of methyl 3,11-diketo-12-bromo-$\Delta^{4,5}$-cholenate. The hydrazone was dissolved in a small volume of a mixture of chloroform and pyruvic acid 2:3 and to the solution hydrogen bromide in acetic acid was added to give a concentration of 0.1 N halogen acid. The solution was allowed to stand 24 hours. Chloroform was added and acidic compounds were removed by washing with water and a dilute solution of sodium bicarbonate. The chloroform was removed and the residue was crystallized from methanol. It was then purified by chromatography; a mixture of benzene and petroleum ether 1:1 eluted from aluminum oxide a crystalline compound which melted at 188–189° and was not depressed when admixed with an authentic sample of methyl 3,11-diketo-12-bromo-$\Delta^{4,5}$-cholenate. The molecular extinction coefficient, $\epsilon$, of methyl 3,11-diketo-12-bromo-$\Delta^{4,5}$-cholenate is 16,600. The maximum absorption in ultraviolet light with methanol as solvent was at 238 m$\mu$. The molecular extinction coefficient at 238 m$\mu$ of the product obtained through dehydrobromination of the dinitrophenylhydrazone as described above was 16,600.

The introduction of the double bond adjacent to the keto group at $C_3$ may be pictured as follows: Formation of the hydrazone modifies the reactivity of the bromine at $C_4$. The halogen appears to be more readily dissociated from the carbon, presumably with formation of a carbonium ion. This ion is then stabilized through the loss of a proton and formation of the double bond $C_4:C_5$.

The double bond at $C_4:C_5$ adjacent to the keto group modifies the color of the hydrazone. The 2,4-dinitrophenylhydrazone of the keto group at $C_3$ with a methylene group at $C_4$ is canary yellow. The 2,4-dinitropenylhydrazone of the ketone with a double bond at $C_4:C_5$ is deep red. The fact that the deep red hydrazone was obtained when 2,4-dinitrophenylhydrazine was added to the keto derivative with an atom of bromine at $C_4$ first indicated that the double bond had been formed. Subsequent investigation showed that the removal of hydrogen bromide was indeed quantitative.

Example 2

Preparation of 3,11,20-triketo-21-acetoxy-$\Delta^4$-pregnene (11-dehydrocorticosterone acetate) from 3,11,20-triketo-21-acetoxypregnane.—Preparation of 3,11,20-triketo-4,12-dibromo-21-acetoxy-pregnane from 3,11,20-triketo-12-bromo-21-acetoxypregnane.—3,11,20-triketo-12-bromo-21-acetoxypregnane (4.0 millimoles) was dissolved in a warm mixture of 5 cc. of chloroform and 40 cc. of acetic acid and the solution was cooled to 25°. Two drops of 1.0 N $Br_2$ solution in acetic acid was added and after an induction period of about 2 minutes 8.00 cc. of 1.00 N Br₂ solution in acetic acid was added as rapidly as it was consumed while the solution was being agitated vigorously. Crystals began to separate after about two-thirds of the bromine solution had been added. Water was added and the bromo steroid was extracted with chloroform. The chloroform solution was washed with a dilute solution of sodium thiosulfate, then with water and filtered through a pad of sodium sulfate. The filtrate was concentrated under reduced pressure and 3,11,20-triketo-4,12-dibromo-21-acetoxypregnane with a melting point of 212–215° was obtained in 91 per cent yield from acetic acid. After recrystallization from chloroform-acetic acid the product melted at 219–220°. $(\alpha)_D = +39° \pm 2°$ (27.0 mg. in 3.00 cc. of chloroform).

$C_{23}H_{30}O_5Br_2$. Calculated: C, 50.56; H, 5.54. Found: C, 50.66; H, 5.71.

*Preparation of 3,11,20-triketo-12-bromo-21-acetoxy-Δ⁴-pregnene-3-(2,4-dinitrophenylhydrazone) from 3,11,20-triketo-4,12-dibromo-21-acetoxypregnane.*— 3,11,20-triketo-4,12-dibromo-21-acetoxypregnane (1.00 millimole), 1.10 millimoles of sodium acetate, and 1.20 millimoles of 2,4-dinitrophenylhydrazine were placed in a flask and 25 cc. of chloroform and 25 cc. of acetic acid were added and the flask was sealed in an atmosphere of carbon dioxide. After about 20 minutes the crystals had dissolved to form a homogeneous red solution. After 1¾ hours the solution was concentrated under reduced pressure to about 15 cc. and sealed in an atmosphere of carbon dioxide. After 14 hours the red crystals were filtered off and washed with acetic acid and then with water. The product weighed 561 mg. (87 per cent yield) and melted at 247–8° (dec.). It analyzed correctly for 3,11,20-triketo-12-bromo-21-acetoxy-Δ⁴-pregnene - 3 - (2,4 - dinitrophenylhydrazone). $(\alpha)_D = +113° \pm 2°$ (29.3 mg. in 3.00 cc. of chloroform). λ max. in CHCl₃ 387 mμ; ε 31,200.

$C_{29}H_{33}O_8N_4Br$. Calculated: C, 53.96; H, 5.15. Found: C, 54.10; H, 5.01.

*Preparation of 3,11,20-triketo-12-bromo-21-acetoxy - Δ⁴-pregnene from 3,11,20 - triketo-12-bromo - 21-acetoxy-Δ⁴-pregnene-3-(2,4-dinitrophenylhydrazone).*—3,11,20 - triketo-12-bromo-21-acetoxy - Δ⁴ - pregnene-3-(2,4-dinitrophenylhydrazone) (5.00 millimoles) was dissolved in 200 cc. of dry alcohol-free chloroform and while the flask was being swept with carbon dioxide, 50 cc. of acetic acid, 50 cc. of pyruvic acid and 10.0 cc. of 3.2 N hydrogen bromide in glacial acetic acid were added. The red solution was sealed in an atmosphere of carbon dioxide and maintained at about 45° for 6 hours. At this time the solution had become orange colored indicating that the 2,4-dinitrophenylhydrazine had been removed from C₃. Water and chloroform were added and the insoluble pyruvic acid 2,4-dinitrophenylhydrazone was filtered off and discarded. The aqueous solution was back extracted with chloroform and the combined chloroform solutions were washed with water, with dilute aqueous sodium bicarbonate until the final aqueous extract was colorless, and then with water. The chloroform solution was filtered through a pad of sodium sulfate and concentrated under reduced pressure and the residue was crystallized from methanol to give 2.00 gm. (86 per cent yield) of 3,11,20-triketo-12-bromo-21-acetoxy-Δ⁴-pregnene which melted at 211–212°. The filtrate was evaporated to dryness under reduced pressure and the residue was reacetylated at C₂₁ by standing in 5 cc. of acetic acid 0.1 N with dry hydrogen bromide for 14 hours. Water was added, the crystals were filtered, washed with water and recrystallized from methanol to give 104 mg. (4.5 per cent) of product which melted at 210–211° and brought the total yield to 90.5 per cent. After repeated crystalliaztion the product melted at 215–216°. $(\alpha)_D + 84° \pm 2°$ (29.2 mg. in 3.00 cc. of chloroform). λ max. in CH₃OH=238 mμ; ε 16,400.

$C_{23}H_{29}O_5Br$. Calculated: C, 59.36; H, 6.28. Found: C, 59.41; H, 6.58.

*3,11,20-triketo-21-acetoxy-Δ⁴-pregnene (11-dehydrocorticosterone acetate) from 3,11,20-triketo-12-bromo-21-acetoxy-Δ⁴-pregnene.*—3,11,20-triketo-12-bromo-21-acetoxy - Δ⁴ - pregnene (2.00 millimoles) was dissolved in 5 cc. of benzene and 20 cc. of glacial acetic acid and the solution was cooled to 14°. While the solution was being agitated 1.0 gm. of powdered zinc was added in portions. The solution was maintained at 14–16° for 20 minutes and then the zinc was filtered off and the filtrate was concentrated under reduced pressure. The residue was distributed between benzene and water, the organic solution was washed with water and concentrated to dryness under reduced pressure. The residue crystallized from acetone-ether to give 558 mg. of material which melted at 183–183.5° and did not depress the melting point of 3,11,20-triketo-21-acetoxy-Δ⁴-pregnene (11-dehydrocorticosterone acetate). From the filtrate two additional crops weighing 160 mg. (M. P. 182–183°) and 27 mg. (M. P. 176–177°) were obtained.

*Example 3*

Preparation of 3,11,20-triketo-17-hydroxy-21-acetoxy-Δ⁴-pregnene (17-hydroxy - 11 - dehydrocorticosterone acetate) from 3,11,20-triketo-17-hydroxy-21-acetoxypregnane.—Preparation of 2-boromo-3,11,20-triketo-17-hydroxy - 21 - acetoxypregnane and 4-bromo-3,11,20-triketo - 17 - hydroxy-21-acetoxypregnane from 3,11,20-triketo-17-hydroxy-21-acetoxypregnane.—

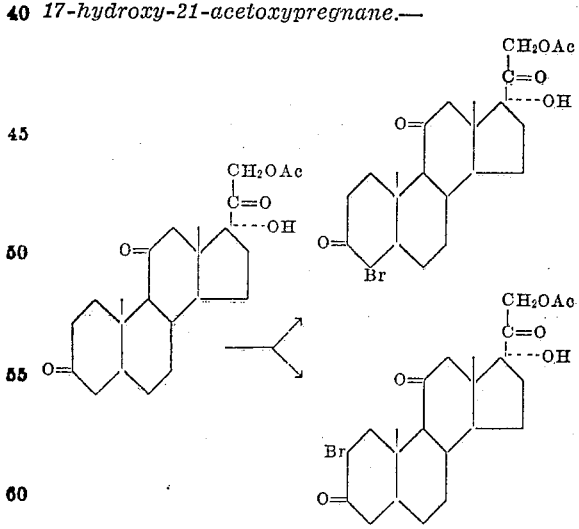

808 mg. of 3,11,20-triketo-17-hydroxy-21-acetoxypregnane were dissolved in 16.0 cc. of glacial acetic acid by warming and the solution was cooled to room temperature. 164 mg. of sodium acetate were dissolved in 3.85 cc. of a 1.04 N solution of Br₂ in glacial acetic acid. 0.40 cc. of 1.0 N HBr in glacial acetic acid were added to the pregnane solution and then, to the resulting solution the bromine solution was added dropwise over a period of 1 to 2 minutes. As soon as the resulting solution became colorless about 10 cc. of water were added. Crystals soon separated and water was added to a volume of about 125 cc. After 5 minutes the precipitate was filtered and washed with water. When dried at 100° for 1 hour the product weighed 858 mg. $(\alpha)_D = +91°\pm2°$ (c=1.01 acetone). When recrystallized twice from ethyl acetate the $(\alpha)_D = +100°\pm2°$ (c=1.03 acetone). This bromo compound, $(\alpha)_D = +100°$, is 4-bromo-3,11,20-triketo-17-hydroxy-21-acetoxypregnane.

$C_{23}H_{31}O_6Br$. Calculated: C, 57.14; H, 6.46; Br, 16.53. Found: C, 57.01; H, 6.65; Br, 16.74.

The filtrate from the 858 mg. was diluted to about 300 cc. with water and was extracted twice with 25 cc. portions of chloroform. The organic solvent was concentrated under reduced pressure to dryness and the residue was crystallized from acetone - carbon tetrachloride. Wt.=48 mg. $(\alpha)_D = +50°\pm2°$ (27.8 mg. in 3.00 cc. of acetone). This product, with $(\alpha)_D = +50°$, is 2-bromo-3,11,20-triketo-17-hydroxy-21-acetoxypregnane.

$C_{23}H_{31}O_6Br$. Calculated: C, 57.14; H, 6.46; Br, 16.53. Found: C, 57.38; H, 6.46; Br, 16.92.

*Preparation of 3,11,20-triketo-17-hydroxy-21-acetoxy-$\Delta^4$-pregnene-3-(2,4-dinitrophenylhydrazone) from 3,11,20-triketo-4-bromo-17-hydroxy-21-acetoxypregnane).*— 3,11,20-triketo-4-bromo-17-hydroxy-21-acetoxypregnane (1.00 millimole, $(\alpha)_D + 98°\pm2°$, c=1.00 in acetone) was converted into 3,11,20-triketo-17-hydroxy-21-acetoxy-$\Delta^4$-pregnene-3-(2,4-dinitrophenylhydrazone) by the procedure described for the preparation of 3,11,20-triketo-12-bromo-21-acetoxy-$\Delta^4$-pregnene-3-(2,4-dinitrophenylhydrazone) from its 4-bromo precursor. The first crop of crystals (467 mg.=60 per cent yield) melted at 232–5°; the second (53 mg.) melted at 187–202°. A sample purified by crystallization from chloroform-acetic acid melted at 240–242°. $\lambda$ max. in $CHCl_3=387$ m$\mu$; $\epsilon=30,500$.

$C_{29}H_{34}O_9N_4$.

Calculated: C, 59.78 H, 5.88 N, 9.61
Found:    C, 58.73 H, 5.70 N, 9.70
          58.86    5.84

*Preparation of 3,11,20-triketo-17-hydroxy-21-acetoxy-$\Delta^4$-pregnene from 3,11,20-triketo-17-hydroxy-21-acetoxy-$\Delta^4$-pregnene-3-(2,4-dinitrophenylhydrazone).*—3,11,20-triketo-17-hydroxy-21-acetoxy-$\Delta^4$-pregnene-3-(2,4-dinitrophenylhydrazone) (1.00 millimole) was placed in a 100 cc. glass stoppered flask and while the flask was being swept with a stream of carbon dioxide 40 cc. of chloroform, 10 cc. of glacial acetic acid and 10 cc. of pyruvic acid were added. The red solution was sealed in an atmosphere of carbon dioxide and maintained at 45° C. for 40 hours. About 300 cc. of water and 50 cc. of chloroform were added, the aqueous phase was separated and back extracted with chloroform and the combined chloroform extracts were washed with water, with dilute aqueous sodium bicarbonate until the last aqueous extract was colorless and then with water. The chloroform solution was filtered through a pad of sodium sulfate and evaporated to dryness under reduced pressure. In order to acetylate any $C_{21}$-hydroxyl group which had been formed by the pyruvic acid treatment the residue was dissolved in 5 cc. of dry alcohol-free chloroform, 5 cc. of pyridine and 5 cc. of acetic anhydride at room temperature. After one hour the excess of acetic anhydride was decomposed with ice, about 50 cc. of chloroform was added and the organic phase was separated and washed with 3 portions of dilute hydrochloric acid, with dilute sodium hydroxide and with water. The chloroform solution was filtered through a pad of sodium sulfate and concentrated to dryness under reduced pressure.

The residue was dissolved in 120 cc. of 95 per cent ethanol and treated with 100 mg. of charcoal to remove a small amount of red impurity. The solution was filtered while hot and the filtrate was concentrated under reduced pressure to give 325 mg. of product which melted at 243–245° and 30 mg. which melted at 236–238°. This material contained one molecule of ethanol of crystallization and was pale yellow. The trace of color was removed by retreatment of the compound with charcoal in ethanol and the solvent-free product was obtained by recrystallization from chloroform-absolute ethyl ether. This colorless material melted at 244–246° and did not depress the melting point of a sample of 3,11,20-triketo-17-hydroxy-21-acetoxy-$\Delta^4$-pregnene (11-dehydro-17-hydroxycorticosterone acetate) which had been obtained from adrenal glands. $[\alpha]_D + 184°\pm4°$ (15.9 mg. in 3 cc. of acetone). $\lambda$ max. in $CH_3OH=238$ m$\mu$; $\epsilon=15,350$.

The reaction of pyruvic acid with 3,11,20-triketo-17-hydroxy-21-acetoxy-$\Delta^4$-pregnene-3-(2,4-dinitrophenylhydrazone) is catalyzed by the presence of hydrogen bromide and by making the solution 0.1 N with dry hydrogen bromide the reaction time may be cut from 20 hours to 6 hours. However, the yield of 3,11,20-triketo-17-hydroxy-21-acetoxy-$\Delta^4$-pregnene is about 5 per cent lower than without the catalyst.

*Conversion of 2-bromo-3,11,20-triketo-17-hydroxy-21-acetoxypregnane to the corresponding $\Delta^{1,3}$-(2,4-dinitrophenylhydrazone) derivative—*

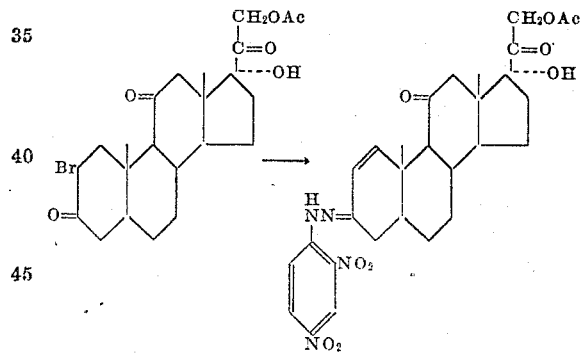

483 mg. of 2-bromo-3,11,20-triketo-17-hydroxy-21-acetoxypregnane, 90 mg. of sodium acetate and 240 mg. of 2,4-dinitrophenylhydrazine were placed in a 300 cc. flask. 25 cc. of glacial acetic acid and 25 cc. of chloroform were added and the flask shaken frequently for about 30 minutes. After 1 hour and 45 minutes the solution was concentrated under reduced pressure to about 10 cc. After 20 hours the yellow crystals which separated were filtered off, washed with acetic acid, then water, and dried. Wt.=414 mg., M. P. 250–258°.

These crystals still contained bromine. To complete the removal of bromine the entire fraction was dissolved in 50 cc. of chloroform and 100 cc. of acetic acid to which 82 mg. of sodium acetate were added. The temperature was maintained at 60°±2° for 30 minutes. The solution was concentrated under reduced pressure, and the residue was distributed between chloroform and water. The chloroform phase was separated, 15 cc. of acetic acid were added and the solution concentrated under reduced pressure to about 10 cc. Crystals formed and were filtered off. The product was recrystallized by dissolving in chloroform, adding acetic acid and concentrating under reduced pressure to about 5 cc. The orange crystals which separated were dried at 100° and 0.1 mm. for 2 hours; M. P. 265–266°. λ max. 381 mμ; ε 28,300 (chloroform).

$C_{29}H_{34}O_9N_4$. Calculated: C, 59.78; H, 5.88. Found, C, 59.56; H, 5.95.

Preparation of 3,11,20-triketo-17-hydroxy-21-acetoxy-Δ¹-pregnene from 3,11,20-triketo-17-hydroxy-21-acetoxy-Δ¹-pregnene-3-(2,4-dinitrophenylhydrazone).—

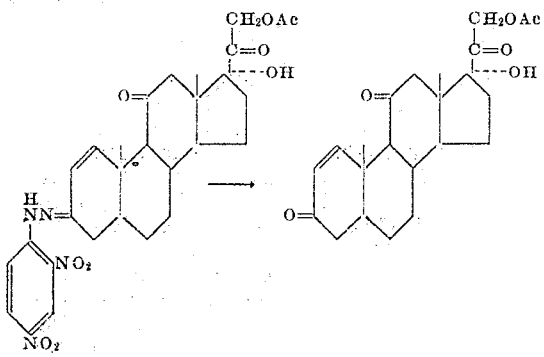

100 mg. of 3,11,20-triketo-17-hydroxy-21-acetoxy-Δ¹-pregnene-3-(2,4-dinitrophenylhydrazone) were introduced into a small glass stoppered flask containing 13.8 cc. of dry alcohol-free chloroform, 3.4 cc. of glacial acetic acid and 3.4 cc. of pyruvic acid. The flask was sealed after the air had been displaced with carbon dioxide and was warmed to about 45° for 72 hours. About 50 cc. of water and 50 cc. of chloroform were added. The chloroform solution was washed with water, a dilute solution of sodium bicarbonate, water, and was then concentrated under reduced pressure to dryness. The residue was dissolved in 10 cc. of hot acetone and the yellow impurities were removed with small (15 mg.) additions of activated carbon. The solution was filtered and the solvent was removed under reduced pressure. The residue was acetylated with 2.0 cc. of acetic anhydride and 2.0 cc. of pyridine and the reagents were removed in the usual manner from a solution of the steroid in chloroform. After removal of this solvent the residue was crystallized from a mixture of a small volume of chloroform and ethyl ether. M. P. 244–245°. λ max. 225 mμ, ε 9,130 (methanol.)

$C_{23}H_{30}O_6$. Calculated: C, 68.63; H, 7.51. Found: C, 68.34; H, 7.72.

While the invention is illustrated in the foregoing examples by the introduction of the double bonds at $C_1:C_2$ and $C_4:C_5$ with a keto group at $C_3$ in specific steroid compounds it will be apparent that the reaction is general in nature and may be employed not only for the formation of the 3-keto-Δ¹,² and 3-keto-Δ⁴,⁵ groups in other steroids but also for introducing the double bond next to the keto group at other positions in steroids and generally for the introduction of the double bond next to a keto group in other carbocyclic compounds.

For instance, referring to Example 2 above, the same general procedure has been applied for the production of 11-dehydrocorticosterone from 3,11,20-triketo-21-acetoxypregnane, i. e. from a starting material differing from that used in Example 2 only in that it did not contain a bromine atom at 12 position. As will be appreciated, when starting from 3,11,20-triketo-21-acetoxy-pregnane, the final step of Example 2, for removal of the 12-bromine, is omitted.

The procedure used for the formation of the 2,4-dinitrophenylhydrazone and regeneration of the 3-keto-Δ⁴-steroid was the same as that used for preparation of the 11-dehydro-12-bromocorticosterone acetate from its 4-bromo precursor. 3,11,20 - triketo - 4 - bromo - 21 - acetoxypregnane, M. P. 188–9°, was converted into 3,11,20-triketo - 21 - acetoxy - Δ⁴ - pregnene - 3 - (2,4-dinitrophenylhydrazone), M. P. 234–5°. Upon treatment of this dinitrophenylhydrazone with pyruvic acid, 11-dehydrocorticosterone acetate, M. P. 180–180.5° was obtained.

The process can be carried out with hydrazines other than the 2,4-dinitrophenylhydrazine used in the specific examples, for instance, semicarbazide and in solvents other than glacial acetic acid, for instance, methanol, dioxane and pyridine.

This application is a continuation-in-part of out application Serial No. 744,170, filed September 15, 1947, now abandoned.

We claim:

1. Process for the introduction of a double bond between carbon atoms vicinal to a keto group in ketosteroids which comprises reacting a ketosteroid having an atom of bromine on the carbon atom alpha to the ketone group and a hydrogen on the next adjacent carbon with a hydrazine derivative of the group consisting of the monocyclicarylhydrazines and semicarbazide thereby eliminating hydrogen bromide from the kerosteroid molecule.

2. Process as defined in claim 1 in which the reaction is carried out in the presence of glacial acetic acid.

3. Process as defined in claim 1 in which the hydrazine derivative employed is 2,4-dinitrophenylhydrazine.

4. Process as defined in claim 1 in which the hydrazine derivative employed is semicarbazide.

5. Process as defined in claim 1 in which 2,4-dinitrophenylhydrazine is reacted with methyl 3,11-diketo-4,12-dibromocholanate dissolved in glacial acetic acid.

6. Process as defined in claim 1 in which the ketosteroid compound is 3,11,20-triketo-4,12-dibromo-21-acetoxypregnane.

7. Process as defined in claim 1 in which the ketosteriod compound is 3,11,20-triketo-4-bromo-17-hydroxy-21-acetoxypregnane.

8. Process as defined in claim 1 in which the ketosteroid compound is 3,11,20-triketo-2-bromo-17-hydroxy-21-acetoxypregnane.

9. Process as defined in claim 1 in which the ketosteroid compound is 3,11,20-triketo-4-bromo-21-acetoxypregnane.

10. As a new product 3,11,20-triketo-12-bromo-21-acetoxy-Δ⁴-pregnene.

EDWARD C. KENDALL.
VERNON R. MATTOX.

REFERENCES CITED

The following references are of record in the file of this patent:

UNITED STATES PATENTS

| Number | Name | Date |
|---|---|---|
| 2,153,700 | Serini | Apr. 11, 1939 |
| 2,183,589 | Reichstein | Dec. 19, 1939 |
| 2,232,636 | Ruzicka | Feb. 18, 1941 |
| 2,260,328 | Miescher | Oct. 28, 1941 |

OTHER REFERENCES

Busch: Jour. Prakt. Chem., 146, 24–25 (1936).